United States Patent
Daboul et al.

(10) Patent No.: US 12,025,103 B2
(45) Date of Patent: Jul. 2, 2024

(54) WIND TURBINE ROTOR BLADE AND WIND TURBINE

(71) Applicant: Wobben Properties GmbH, Aurich (DE)

(72) Inventors: Hussam Daboul, Südbrookmerland (DE); Muhanad Mahmoud, Aurich (DE); Diethelm Godenau, Rosian (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/350,475

(22) Filed: Jul. 11, 2023

(65) Prior Publication Data
US 2024/0018941 A1    Jan. 18, 2024

(30) Foreign Application Priority Data
Jul. 12, 2022  (EP) .................................... 22184291

(51) Int. Cl.
*F03D 80/40*  (2016.01)
*F03D 1/06*  (2006.01)
*F03G 7/06*  (2006.01)

(52) U.S. Cl.
CPC ........... *F03D 80/40* (2016.05); *F03D 1/0675* (2013.01); *F03G 7/064* (2021.08)

(58) Field of Classification Search
CPC ............................... F03D 1/0675; F03D 80/40
See application file for complete search history.

(56) References Cited

U.S. PATENT DOCUMENTS

2013/0255796 A1*  10/2013  Dimascio ................ F03D 7/022
                                                                       137/334

FOREIGN PATENT DOCUMENTS

| EP | 3048296 A1 | 7/2016 |
| EP | 3048297 A1 | 7/2016 |
| WO | WO 2017021350 A1 | 2/2017 |
| WO | WO 2018211055 A1 | 11/2018 |

* cited by examiner

*Primary Examiner* — Brian O Peters
(74) *Attorney, Agent, or Firm* — Seed IP Law Group LLP

(57) ABSTRACT

A wind turbine rotor blade, with a length, a rotor blade root, a rotor blade tip, a pressure side, a suction side, a leading edge, a trailing edge, and an air guide for heated air to guide heated air inside of the rotor blade and along a longitudinal direction of the rotor blade from the rotor blade root in the direction of the rotor blade tip. The wind turbine rotor blade additionally comprises at least one passively controllable air control element in the area of the air guide. The invention further relates to a wind turbine with at least one wind turbine rotor blade.

11 Claims, 6 Drawing Sheets

WIND TURBINE ROTOR BLADE AND WIND TURBINE

BACKGROUND

Technical Field

The present invention relates to a wind turbine rotor blade and a wind turbine.

Description of the Related Art

Since rotor blades are exposed to all weather conditions unprotected, the rotor blades can become iced at specific temperatures. A rotor blade heater can be used to prevent this. Either a heater can here be provided outside on the rotor blade, or heated air can be made available inside of the rotor blade. For example, this can take place by means of a heating register, which generates hot air that is then blown into the interior of the rotor blade.

WO 2017/021350 A1 shows a wind turbine rotor blade with a rotor blade root area and a rotor blade tip area, as well as a rotor blade heater. At least one web is further provided along a longitudinal axis of the rotor blade. A deflection unit in the form of a bar drop can be provided on the web, so as to reduce air turbulence in the deflection process.

WO 2018/211055 shows a wind turbine rotor blade with a rotor blade heater. The rotor blade has a web and a deflection unit in the area of the rotor blade tip for deflecting heated air.

On the European patent application from which priority is claimed the European Patent Office searched the following documents: EP 3 048 296 A1 and EP 3 048 297 A1.

BRIEF SUMMARY

Provided is a wind turbine rotor blade that enables an improved heating of the rotor blade.

Provided is a wind turbine rotor blade with a rotor blade root, a rotor blade tip, a pressure side, a suction side, a leading edge, and a trailing edge. The rotor blade has a longitudinal direction. A rotor blade heater is used to generate hot air, which is then blown into the interior of the rotor blade. At least one passively controllable air control element is provided in the air guide inside of the rotor blade. The air control element makes it possible to influence or control the air flow in the air guide inside of the rotor blade. As a result, for example, the air masses with varying temperatures (hot air in the middle of the air flow and colder air toward the rotor blade exterior) mix together better inside of the rotor blade.

The passively controllable air control element optionally has a temperature-dependent section, which changes its shape depending on the temperature. Therefore, the air control element reacts automatically to a change in temperature, which leads to a change in the air guide. The temperature-dependent change can exert an influence on the air flow so as to increase efficiency. At least one web is optionally provided between the pressure side and the section side along the longitudinal direction of the rotor blade. The air heated by the rotor blade heater can be blown along the web in the direction of the rotor blade tip, where it is deflected, so that the heated air on the other side of the web can flow back from the rotor blade tip area to the rotor blade root area. At least one passively controllable air control element can be provided along a web to influence the air flow.

The passively controllable air control element has no active control elements, but rather only passively controllable elements. As a result, there is no active intervention in the air control elements. The passively controllable element can permit a temperature-dependent, passive control. To this end, the air control element can at least partially allow a temperature-dependent deformation.

According to an aspect, the passively controllable air control element can have a bimaterial section with a first and a second material section. The material of the first material section has a different thermal expansion coefficient than the material of the second material section. Given a change in temperature, it can thus happen that the first and the second material section expand differently, thereby resulting in a deformation of the bimaterial section.

The bimaterial section is preferably provided as a bimetal section with a first and second metal section with different heat expansion coefficients. As the temperature increases, the first and second metal sections, which are coupled with each other, expand differently, causing the bimetal section to bend in the direction of the metal section with the lower expansion coefficient. This change in shape exerts an influence on the air flow of the heated air inside of the rotor blade.

The passively controllable air control element can be designed as a passively controlled, static mixer. The mixer has a bimaterial section with a first and second material, which are coupled together, and have different heat expansion coefficients. An air conducting element is further coupled to the bimaterial section. For example, deforming the bimaterial section leads to a change in the angle of the air guide element. As a consequence, an air flow in the air guide of the rotor blade heater inside of the rotor blade can be changed by the passively controlled, static mixer, for example. The bimaterial section deforms according to the temperature, thereby changing the position of the air conducting unit, which in turn produces a change in the air flow in the air guide.

The passively controlled air control element can be designed as a passively controlled swirl generator. The swirl generator can have a bimaterial section with a first and second material with different heat expansion coefficients. A heating or cooling of the bimaterial section is accompanied by a deformation of the bimaterial section. As a consequence, a change in the shape of the swirl generator takes place, thereby changing the air flow in the air guide of the rotor blade heater inside of the rotor blade. This makes it possible to achieve a passively controlled change in the air flow inside of the air guide of the rotor blade.

The passively controllable air control element can have an element that has a temperature-dependent change in length. This element can be coupled with a baffle plate, so that an angle of the baffle plate changes depending on the temperature, for example. As a result, the air flow inside of the air guide can be deflected, so that a swirling of the different temperature can take place. For example, the angle of the baffle plate can be enlarged with increasing temperature.

The passively controllable air flow elements can also be retrofitted in existing rotor blades.

The passively controlled air control elements can optionally be used to locally improve the rotor blade heater by locally influencing the air flow of the rotor blade heater.

The passively controllable air control element has at least a first and second operating position, wherein the air control element is active in the first operating position, and not active in the second operating position. Alternatively thereto, the air control element can be not active in the first operating position, and active in the second operating position. The transition from the first into the second operating position or from the second into the first operating position takes places depending on the temperature. In particular, a transition between the first and second operating positions takes place based upon a nonlinear expansion in the length of a bimaterial element, which has a first and a second material section with different heat expansion coefficients.

The passively controlled air control elements can be active (Vortex Generators VG, static mixer, flap (open)) in the initial position, and inactive (Vortex Generator VG inactive, static mixer inactive, flap (closed)) in the final position or vice versa. This can be achieved by the bimaterial element via targeted positioning or preloading.

The passively controllable air control element can be arranged on an inner wall of the rotor blade or on a web inside of the rotor blade. Alternatively thereto, the passively controllable air control element can also be fastened to other components in the interior of the rotor blade. In particular, an end of the passive air control element can here be fastened to the web or the inner wall, so that the other end protrudes into the inner volume of the rotor blade, and deforms depending on the temperature.

The passively controllable air control element with the temperature-dependent deformation can be configured as a swirl generator, static mixer and/or deflection bucket. The temperature-dependent variability (for example through the use of two bimaterial elements) can provide a passively controllable air control element that only acts on the air flow when needed. This is advantageous, since the passively controllable air control elements only act on the air flow if this is actually needed. For example, this makes it possible to avoid a permanent pressure loss caused by the passively controllable air control elements acting on the air flow of the rotor blade heater.

In particular if the passively controllable air control elements do not lead to a change in the air flow of the rotor blade heater in their normal operating mode, this will also not result in an impaired air flow in the normal state.

The passively controllable air control elements placed along the rotor blade can exert a local influence on the air flow of the rotor blade heater. This enables an improved local heating of specific sections of the rotor blade by the passively controllable air flow elements, so as to prevent or reduce ice buildup.

This allows for the possibility of not heating all areas of the rotor blade, but rather of achieving a local change in the temperature distribution.

Additional embodiments of the invention are the subject of the subclaims.

BRIEF DESCRIPTION OF THE SEVERAL VIEWS OF THE DRAWINGS

Advantages and exemplary embodiments of the invention will be explained in more detail below with reference to the drawing.

DETAILED DESCRIPTION

Figure 1:
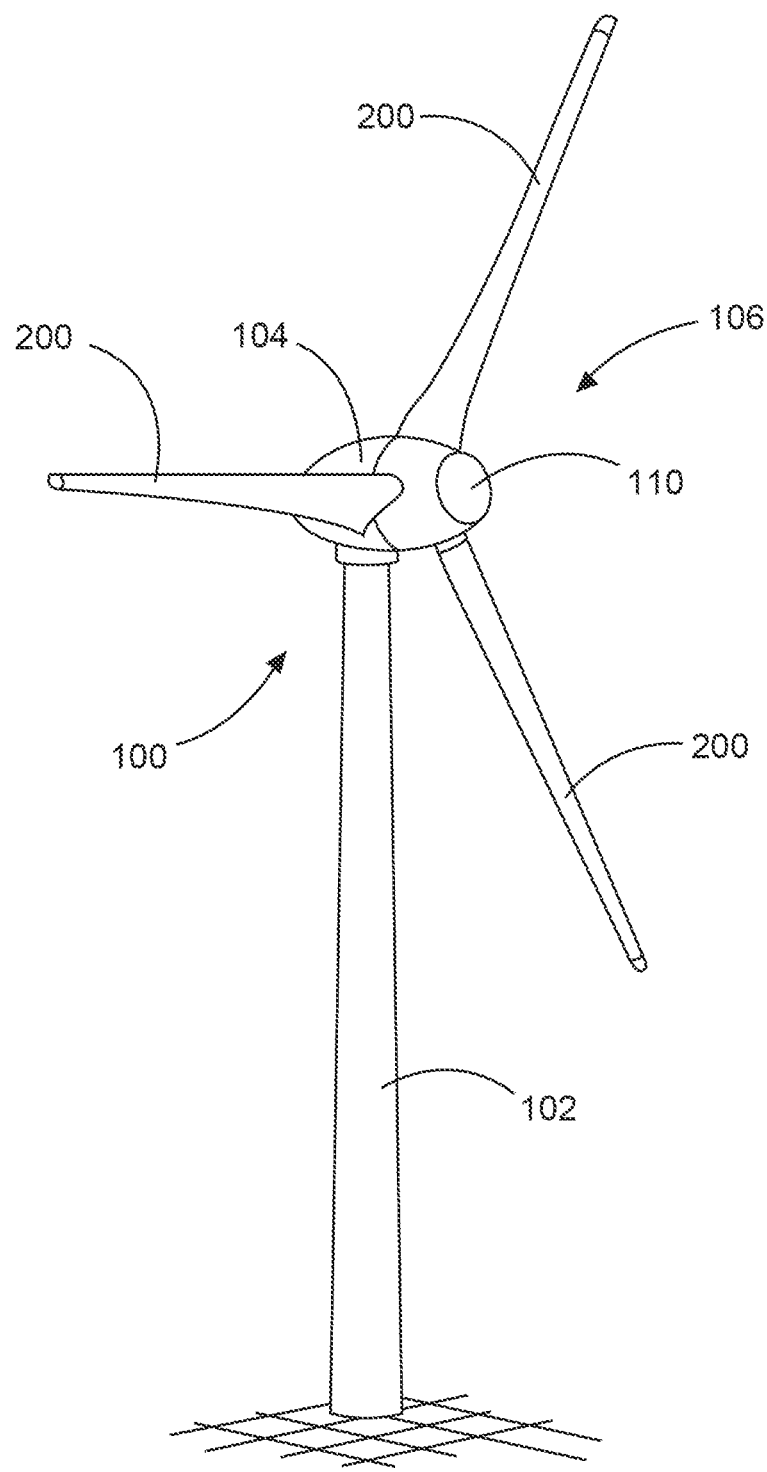
FIG. 1 shows a schematic view of a wind turbine according to the invention.

FIG. 1 shows a schematic view of a wind turbine according to the invention. The wind turbine 100 has a tower 102 and a nacelle 104 on the tower 102. An aerodynamic rotor 106 with three rotor blades 200 and a spinner 110 is provided on the nacelle 104. During operation of the wind turbine, the aerodynamic rotor 106 is made to rotate by the wind, and thereby also turns a rotor or runner of a generator, which is directly or indirectly coupled with the aerodynamic rotor 106. The electric generator is arranged in the nacelle, and generates electric energy. The pitch angles of the rotor blades 200 can be changed by pitch motors on the rotor blade roots 210 of the respective rotor blades 200.

Figure 2:
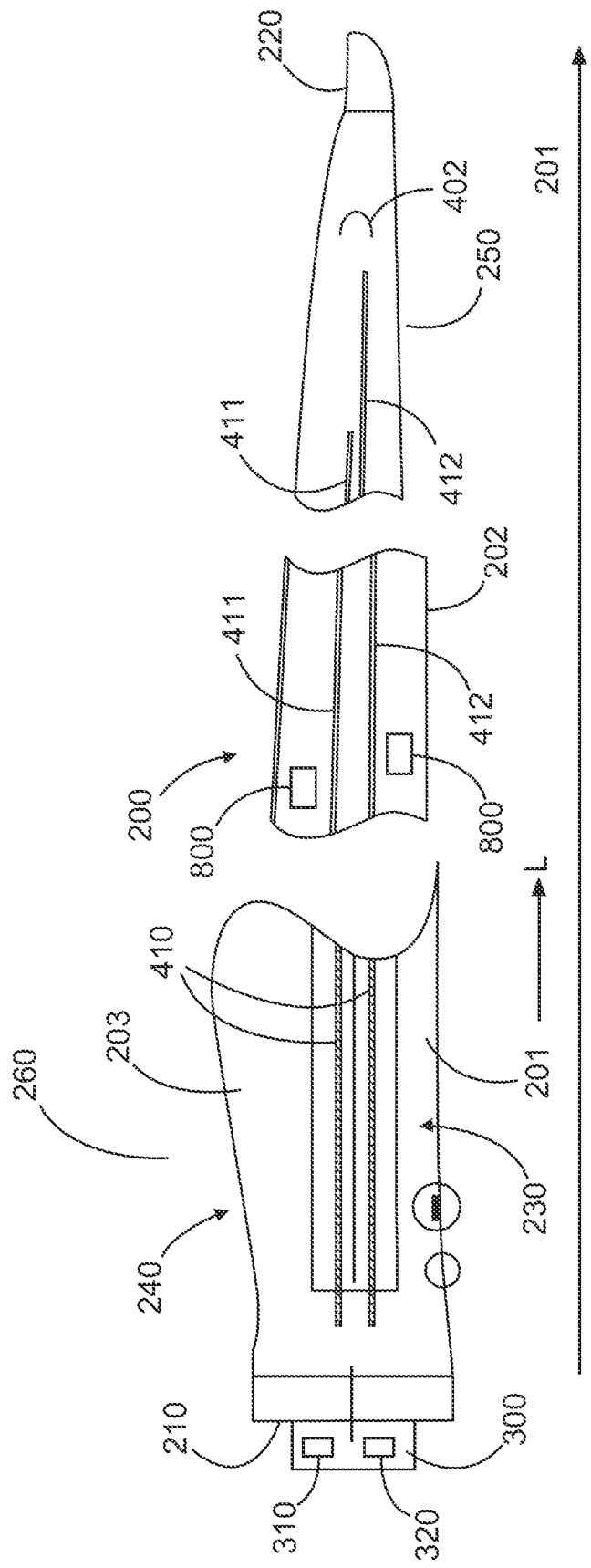
FIG. 2 shows a schematic, sectional view of the rotor blade of the wind turbine on FIG. 1 according to a first exemplary embodiment.

FIG. 2 shows a schematic, sectional view of the rotor blade of the wind turbine on FIG. 1 according to a first exemplary embodiment. The rotor blade 200 has a length 201, a rotor blade wall 202, an inner volume 203, a rotor blade root 210, a rotor blade tip 220, a leading edge 230, a trailing edge 240, a pressure side 250, and a suction side 260. Provided inside of the rotor blade 200 is an air guide 400, for example which can be designed like a web 410. A rotor blade heater 300 can be provided in the area of the rotor blade root 210. The rotor blade heater 300 can have a fan 320 and a heating unit 310, and generate hot air that can be guided into the interior of the rotor blade 200, i.e., the inner volume 203.

At least one web 410, 411, 412 extends along a longitudinal direction L of the rotor blade 200 inside of the rotor blade, and is part of the air guide 400 or already present for other reasons, with the air guide 400 having only a secondary function. More than one web can optionally be provided.

The air heated by the rotor blade heater 300 can be guided along the web 411 as part of the air guide 400 in the direction of the rotor blade tip 220, and then be deflected in the area of the rotor blade tip 220. To this end, a deflection section 402 can be present in the area of the rotor blade tip 220. The rotor blade tip 220 can optionally be at least partially hollow in design, so that a portion of the heated air can flow through the rotor blade tip 220, in order to also deice the rotor blade tip 220.

The heated air can be generated by means of the rotor blade heater 300 either in the rotor blade root area, by virtue of a heating unit 310 heating the air, or the heated air is supplied to the rotor blade 200 in the area of the rotor blade root 210.

At least one passively controllable air control element 800 can be provided along the length L of the rotor blade 200 in the air guide 400. The passively controllable air control element 800 is used to control or influence the air flow of the rotor blade heater inside of the rotor blade 200, e.g., via a temperature-dependent change in shape.

Figure 3:
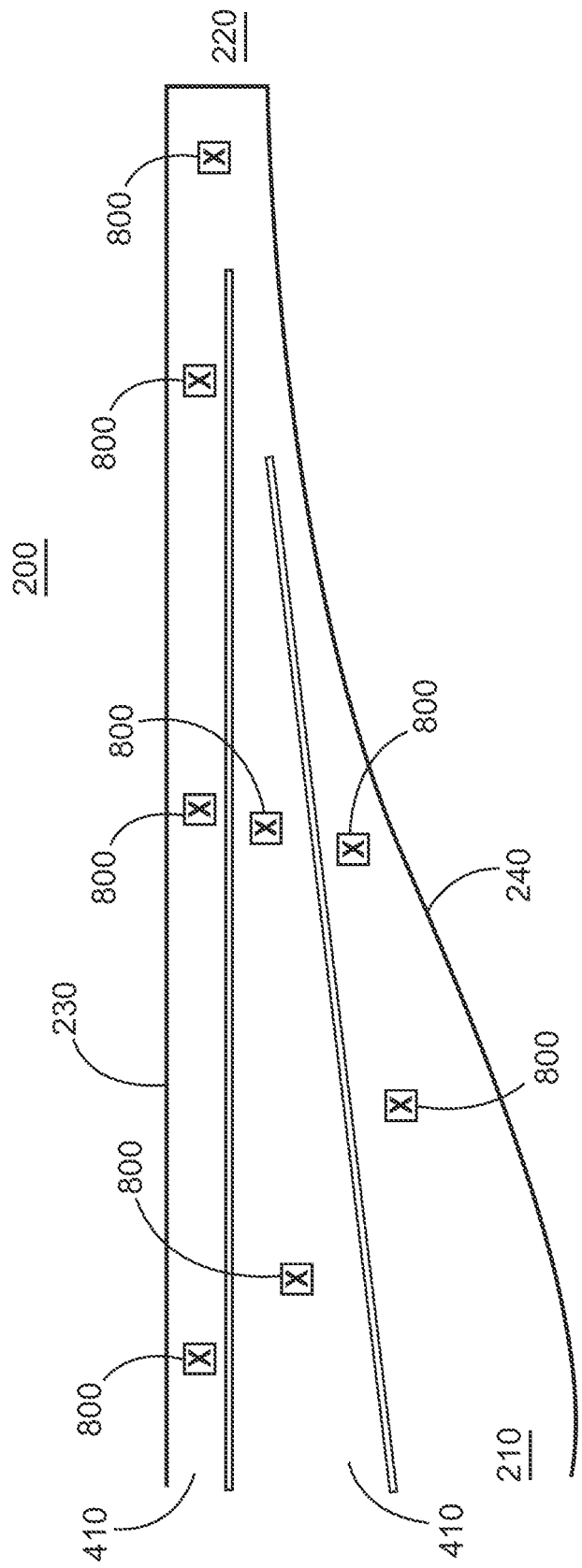
FIG. 3 shows a schematic, sectional view of a rotor blade of a wind turbine on FIG. 1 according to a second exemplary embodiment.

FIG. 3 shows a schematic view of a rotor blade according to a second exemplary embodiment. The rotor blade 200 has a rotor blade root 210, a rotor blade tip 220, a leading edge 230, and a trailing edge 240. Provided inside of the rotor blade is at least one web 410, which extends from the area of the rotor blade root 210 into the area of the rotor blade tip 220. The rotor blade 200 has at least one passively controllable air control element 800. This type of passively controllable air control element can be arranged along the length of the webs 410.

According to an aspect of the present invention, the passively controllable air control element 800 can be provided at different locations along the length L of the rotor blade 200 and in the interior of the rotor blade 200, for example between a web 411 and the rotor blade wall 202, or between a web 410 and a rotor blade trailing edge 430.

According to an aspect of the present invention, the passively controllable air control element 800 is used to (locally) influence an air flow inside of the air duct of the rotor blade, e.g., via a temperature-dependent change in shape.

Figure 4:
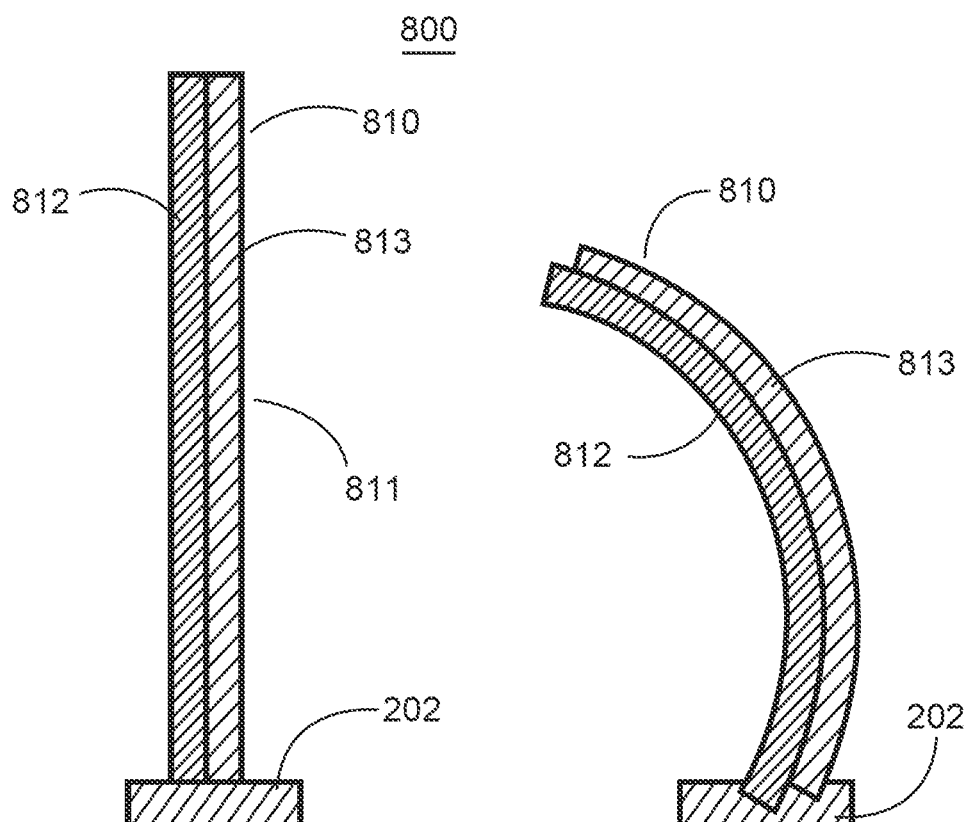
FIG. 4 shows a schematic view of a passively controllable air control element.

FIG. 4 shows a schematic view of a passively controllable air control element. The passively controllable air control element 800 can be configured as a passively controlled flow deflector 810. The flow deflector 810 has a bimaterial element 811 with a first material section and a second material section 812, 813, wherein the heat expansion coefficients of the two material sections 812, 813 differ. The flow deflector 810 preferably has a bimetal element 811 with a first metal section and a second metal section 812, 813, wherein the heat expansion coefficients of the two metal sections 812, 813 differ. As a consequence, one of the two metal sections expands to a greater extent than the other one while heating the flow deflector 810, causing the flow deflector 810 to bend. This temperature-dependent change in shape leads to a different influence being exerted on the air flow in the air guide 400. The air control element 800 can be fastened to a rotor blade wall and/or to a web 410, and can protrude into the inner volume 203 of the rotor blade 200.

Figure 5:
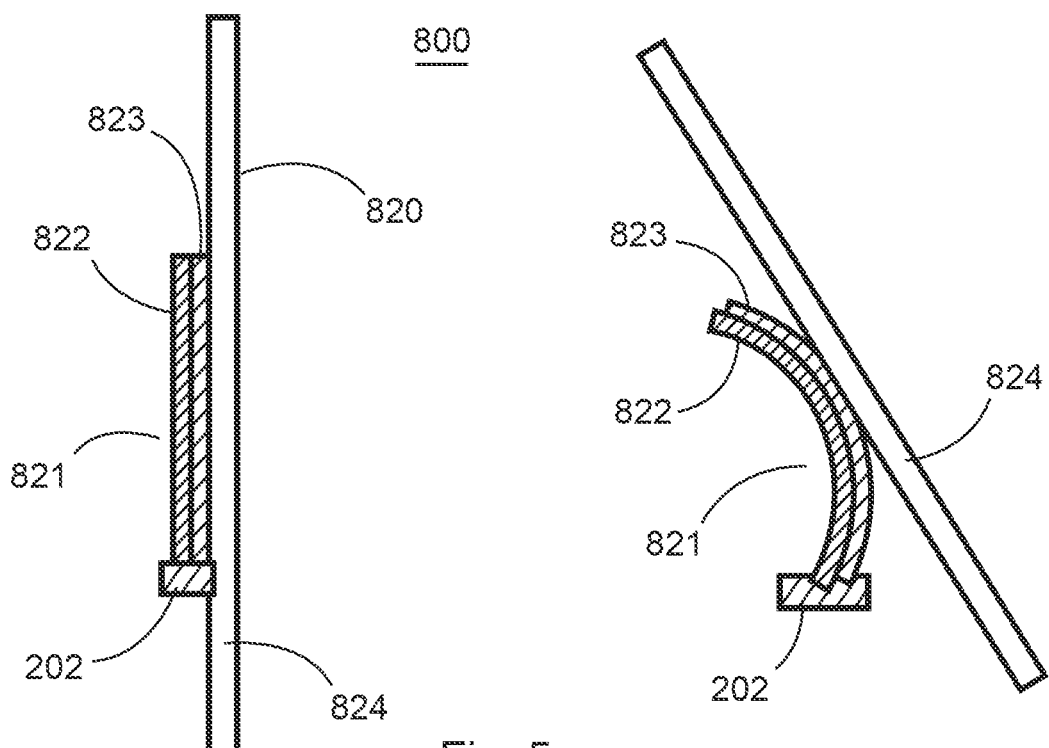
FIG. 5 shows a schematic view of a passively controllable air control element.

FIG. 5 shows a schematic view of a passively controllable air control element. The air control element can be configured as a passively controlled static mixer 820. To this end, the mixer 820 has a bimaterial element 821 with a first and second material section 812, 813, which each have a different heat expansion coefficient. Further provided is an air guide element 824, which is coupled with the bimaterial section 821. During the heating process, the bimaterial element 821 bends, so that the position of the air guide element 824 fastened to it also changes. In particular, an angle of the air guide element 824 can be changed as shown on FIG. 5, for example. This temperature-dependent change in temperature leads to a different influence being exerted on the air flow in the air guide 400. The air control element 800 can be fastened to a rotor blade wall and/or to a web 410, and can protrude into the inner volume 203 of the rotor blade 200.

Figure 6:
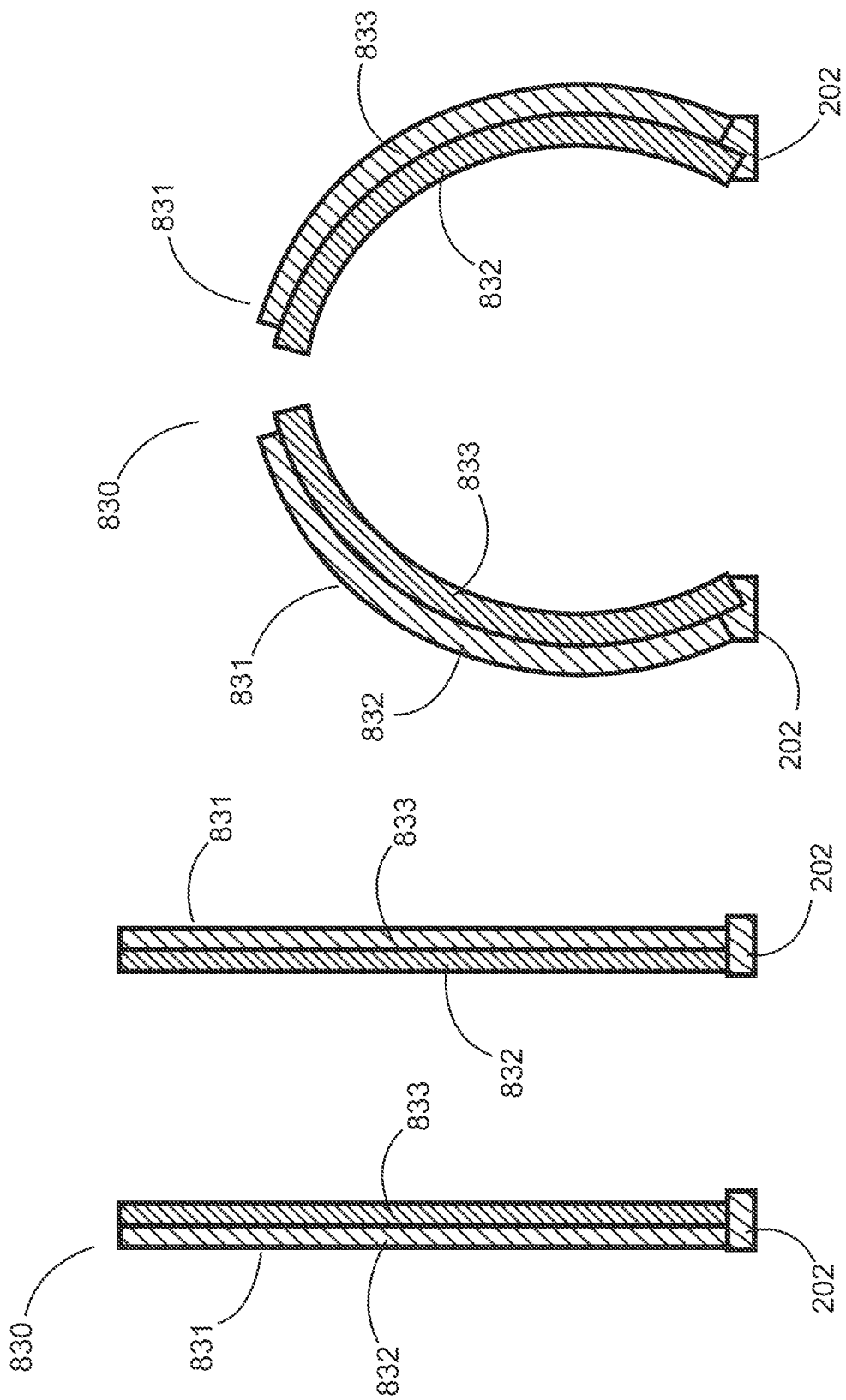
FIG. 6 shows a schematic view of a passively controllable air control element.

FIG. 6 shows a schematic view of a passively controllable air control element. For example, the air control element can be configured as a passively controlled swirl generator 830. The passively controlled swirl generator 830 has a bimaterial element 831 with a first and second material section 832, 833, which have different heat expansion coefficients, so that the bimaterial element 831 bends when heated. The bimaterial section can be configured as a bimetal section with two different metal sections with different heat expansion coefficients. This makes it possible for there to be a change in the shape of the swirl generator 830. In particular, this makes it possible to passively control the shape of the swirl generator 830, for example depending on a temperature. In particular, this is advantageous because no active actuators are thus needed for changing the shape of the swirl generators. The air control element 800 can be fastened to a rotor blade wall and/or to a web 410, and can protrude into the inner volume 203 of the rotor blade 200.

Figure 7:
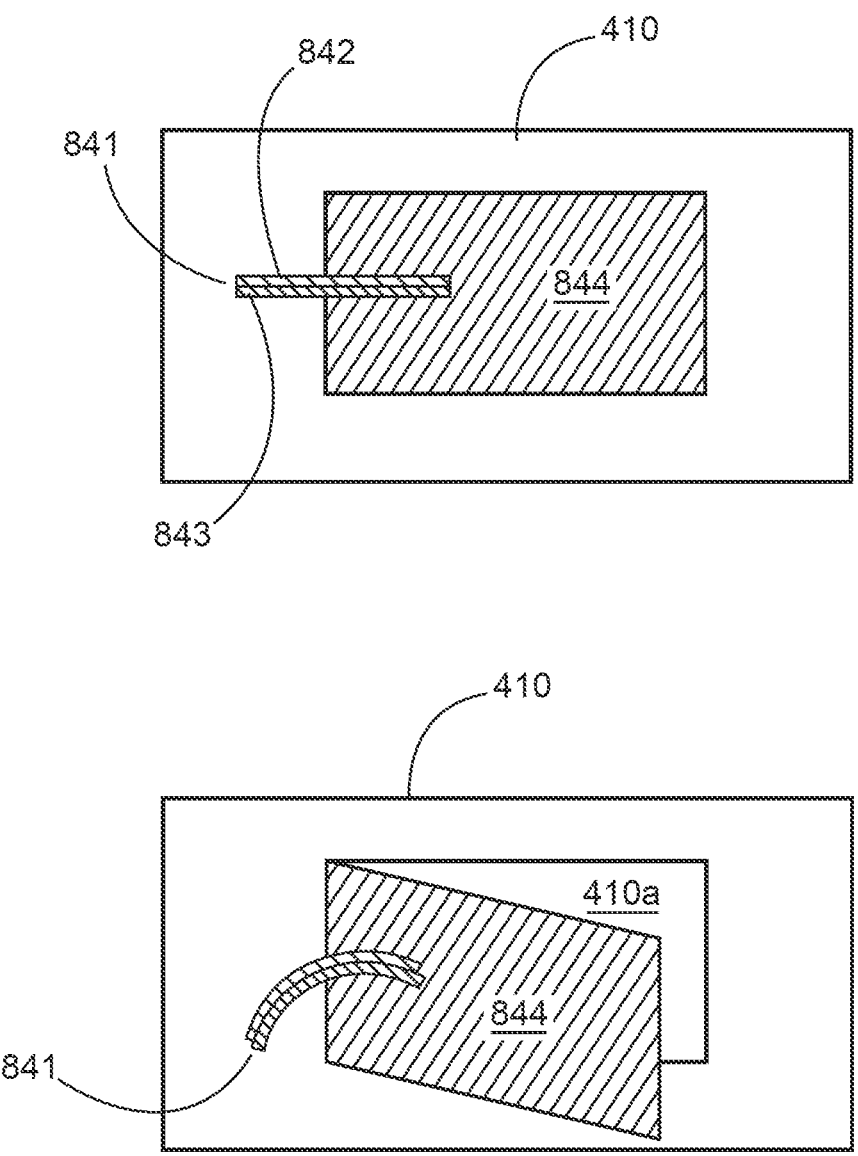
FIG. 7 shows a schematic view of a passively controllable air control element.

FIG. 7 shows a schematic view of a passively controllable air control element. For example, the air control element 800 can be configured as a passively controlled flap unit 840. The passively controlled flap unit 840 can have a bimaterial section 841 with a first and second material section 842, 843. For example, the bimaterial section 841 can be coupled with a flap 844, so that the flap 844 can be opened or closed by deforming the bimaterial section 841. For example, this type of flap 844 can be provided in or on a web 410 inside of the rotor blade. By opening and closing the flap 844, an opening 410a in the web can thus be opened or closed, thereby influencing an air flow. The air control element 800 can be fastened to a rotor blade wall and/or to a web 410, and can protrude into the inner volume 203 of the rotor blade 200.

According to an aspect of the present invention, the passively controlled air control element can significantly improve the air flow in the air guide for the rotor blade heater as a result of an elevated heat exchange on the surface to be heated (rotor blade wall) to be heated.

According to an aspect of the present invention, already installed rotor blades can be retrofitted with passively controlled air control elements, so as to raise the efficiency of the rotor blade heater.

In particular, the passively controlled air control elements can be used in rotor blades of a wind turbine that have a large length and a smaller inner cross section.

According to an aspect of the present invention, using passively controlled air control elements makes it possible to significantly improve a temperature of the air flow on the rotor blade shell. While the temperature of the air flow on the shell can already drop to 50° C. in prior art, the aerodynamic mixers can be used to increase the temperature of the air flow on the inner wall significantly, in particular to 70-80° C.

An improved heat transfer from the heated air to the material of the shell of the rotor blade can thus be achieved without the pressure losses being raised significantly in the process.

A thermal exchange cooler can thus improve a flow near the wall with a warm flow remote from the wall, without higher pressure losses resulting at the same time.

The passively controllable air control elements can be used here to activate (i.e., deform, for example) the elements if they are needed.

The passively controllable air control element 800 can have at least one first and second operating position. As shown on FIG. 4, a first operating position can be provided in which the air control element is straight in design. In a second operating position (shown on the right of FIG. 4), the passive air control element can be deformed. A temperature change can have occurred between the first and second operating position, for example as shown on FIG. 4.

As exemplarily shown on FIG. 5, the passive air control element can have a first operating position (left on FIG. 5) and a second operating position (right on FIG. 5). The air control element can be straight in design in the first operating position, and the air control element can be deformed in design in the second operating position.

On FIG. 6, the air control element can have a first operating position (left) and a second operating position (right). The air control element can be straight in design in the first operating position, and the air control element can be deformed in design in the second operating position.

FIG. 7 shows a first operating position (above) and a second operating position (below). The air control element can be straight in design in the first operating position, and the air control element can be deformed in design in the second operating position.

The passively controlled air control elements can be active or passive in the initial position. A change can take place by influencing the bimaterial section (i.e., depending on temperature). If the air control elements are active, the Vortex Generators VG can then be active, the static mixer can be active, and the flap can be open. The passively controlled air control elements can be inactive in their final position, i.e., the Vortex Generators VG are inactive, the static mixers are inactive, and the flap can be closed. Alternatively thereto, the passively controlled air control elements could also be oppositely configured, i.e., the air control elements are inactive in the initial position and active in the final position.

REFERENCE LIST

100 Wind turbine
102 Tower
104 Nacelle
106 Rotor
110 Spinner
200 Rotor blades
201 Length
202 Rotor blade wall
203 Inner volume
210 Rotor blade root
220 Rotor blade tip
230 Leading edge
240 Trailing edge
250 Pressure side
260 Suction side
300 Rotor blade heater
310 Heating unit
320 Fan
400 Air guide
402 Deflection section
410 Web
410a Opening
411 Web
412 Web
800 Passively controllable air control element
810 Flow deflection element
811 Bimaterial element/bimetal element
812 First material section/metal section
813 Second material section/metal section
820 Passively controllable static mixer
821 Bimaterial element/bimetal element
822 First material section/metal section
823 Second material section/metal section
824 Air guide element
830 Passively controlled swirl generator
831 Bimaterial element/bimetal element
832 First material section/metal section
833 Second material section/metal section
840 Passively controlled flap unit
841 Bimaterial element/bimetal element
842 First material section/metal section
843 Second material section/metal section
844 Flap
L Length direction The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine rotor blade comprising:
   a rotor blade body having:
     a longitudinal length,
     a rotor blade root,
     a rotor blade tip,
     a pressure side,
     a suction side,
     a rotor blade wall, and
     an inner volume,
   an air guide for guiding heated air inside of the rotor blade body and along the longitudinal direction of the rotor blade from the rotor blade root to the rotor blade tip, and
   at least one passively controllable air control element to control or influence an air flow in an area of the air guide and in the inner volume.

2. The wind turbine rotor blade according to claim 1, wherein the passively controllable air control element has a temperature-dependent section, wherein the temperature-dependent section changes shape depending on the temperature.

3. The wind turbine rotor blade according to claim 1, wherein:
   the air guide has at least one web arranged between the pressure side and the suction side, and extends along the longitudinal direction of the rotor bladebody,
   the at least one passively controllable air control element is arranged along the at least one web.

4. The wind turbine rotor blade according to claim 1, wherein the passively controllable air control element has a bimaterial element having first and second material sections with different heat expansion coefficients.

5. The wind turbine rotor blade according to claim 1, wherein the passively controllable air control element is designed as a flow deflection element with a bimetal element with first and second bimetal sections.

6. The wind turbine rotor blade according to claim 1, wherein the passively controllable air control element is a passively controllable static mixer with a bimaterial element, wherein a shape of the bimaterial element depends on temperature.

7. The wind turbine rotor blade according to claim 1, wherein:
   the passively controllable air control element has at least one passively controlled swirl generator, and
   the passively controlled swirl generator has a bimaterial element with first and second bimaterial sections, wherein heat expansion coefficients of the first and second bimaterial sections are different from each other.

8. The wind turbine rotor blade according to claim 1, wherein:
   the passively controllable air control element has at least first and second operating positions,
   the passively controllable air control element actively influences air controller in the first operating position, and
   air flow is not influenced in the second operating position.

9. The wind turbine rotor blade according to claim 1, wherein:

the passively controllable air control element has at least first and second operating positions,
the control element does not influence air flow in the first operating position, and
the air control element actively influences air flow in the second operating position.

10. The wind turbine rotor blade according to claim 1, wherein the at least one passively controllable air control element is arranged along an inner wall of the rotor blade body.

11. A wind turbine comprising at least one wind turbine rotor blade according to claim 1.

* * * * *